(12) United States Patent
Gill et al.

(10) Patent No.: US 8,354,830 B2
(45) Date of Patent: *Jan. 15, 2013

(54) SYSTEMS AND METHODS FOR SELF-RECYCLING POWER

(75) Inventors: Jaspal Gill, Danville, CA (US); David Owen, Livermore, CA (US); Thuan Che, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/363,157

(22) Filed: Jan. 31, 2012

(65) Prior Publication Data

US 2012/0126774 A1    May 24, 2012

Related U.S. Application Data

(63) Continuation of application No. 11/847,659, filed on Aug. 30, 2007, now Pat. No. 8,129,974.

(51) Int. Cl.
*G05F 1/40* (2006.01)
(52) U.S. Cl. ............ 323/282; 323/288; 307/139
(58) Field of Classification Search .......... 323/266, 323/271, 282, 284, 288, 267, 351; 307/125, 307/126, 130
See application file for complete search history.

(56) References Cited

U.S. PATENT DOCUMENTS

| | | | |
|---|---|---|---|
| 4,061,949 A | 12/1977 | Griffis | |
| 5,903,139 A * | 5/1999 | Kompelien | 323/282 |
| 6,055,068 A | 4/2000 | Abe et al. | |
| 6,420,860 B1 | 7/2002 | Yamaguchi | |
| 6,509,724 B1 | 1/2003 | Ilic et al. | |
| 6,548,996 B2 * | 4/2003 | Yi | 323/349 |
| 6,943,533 B2 | 9/2005 | Okuno | |
| 8,129,974 B1 * | 3/2012 | Gill et al. | 323/288 |
| 2008/0054728 A1 | 3/2008 | Watson | |

OTHER PUBLICATIONS

Co-pending U.S. Appl. No. 11/847,659, filed Aug. 30, 2007 entitled "Systems and Methods for Self-Recycling Power", by Gill et al., 22 pages.

* cited by examiner

*Primary Examiner* — Jessica Han
(74) *Attorney, Agent, or Firm* — Harrity & Harrity, LLP (57) ABSTRACT

A power system includes a switch, a capacitor and a comparator circuit. The power system receives a signal to turn off power supplied to the power system, turns off the switch that is used to supply power to the system and discharges the capacitor. The power system also compares a voltage across the discharging capacitor to a threshold voltage value, and turns on the switch to allow power to be supplied to the power system when the compared voltage across the discharging capacitor equals the threshold voltage value.

19 Claims, 5 Drawing Sheets

SYSTEMS AND METHODS FOR SELF-RECYCLING POWER

RELATED APPLICATION

This application is a continuation of U.S. application Ser. No. 11/847,659, filed Aug. 30, 2007, the entire disclosure of which is incorporated herein by reference.

BACKGROUND OF THE INVENTION

The present invention relates generally to power systems and, more particularly, to power systems that reset or recycle power within the power system.

Conventional power systems generally include a main switch that enables an available voltage to be applied to a power system and controlling circuitry that receives commands from an external source to shut off or reset power to the system. In response to a received reset or recycle command, the controlling circuitry may turn the main switch to an off state. While the main switch is turned off, the controlling circuitry must rely on power from another source in order to switch the main switch back on. Providing additional power sources for controlling circuitry during reset periods adds to the cost and complexity of power systems.

SUMMARY OF THE INVENTION

According to one aspect, a method is provided. The method may comprise receiving a signal to turn off power supplied to a power system, where the power system includes a switch, and a capacitor; turning off the switch that is used to supply power to the power system and discharging the capacitor; comparing a voltage across the capacitor to a threshold voltage value; and turning on the switch to allow power to be supplied to the power system when the compared voltage across the capacitor equals the threshold voltage value.

According to another aspect, a device is provided. The device may comprise controlling power logic (CPL) configured to receive a signal to turn off power supplied to a power system; a first switch that receives a signal from the CPL to turn off power; a capacitor, where the capacitor begins to discharge when the first switch is turned off; and a voltage comparator circuit that compares a voltage of the discharging capacitor to a threshold voltage value and turns the first switch on when the voltage of the discharging capacitor equals the threshold voltage value.

According to another aspect, a method is provided. The method may comprise discharging a capacitor when a switch that supplies power to a power system is turned to an off state; and turning the switch to an on state when the capacitor has discharged to a threshold voltage level.

According to another aspect, a device is provided. The device may comprise means for controlling a switch to supply power to a power system; means for storing and discharging energy in the power system; and means for comparing a voltage produced by the means for storing and discharging energy in the power system to a threshold voltage when the means for controlling a switch has set the switch to an off state, where the means for comparing a voltage produced by the means for storing and discharging energy sets the switch to an on state when the compared voltage equals the threshold voltage.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the embodiments. Instead, the scope of the embodiments is defined by the appended claims and their equivalents.

Figure 1:
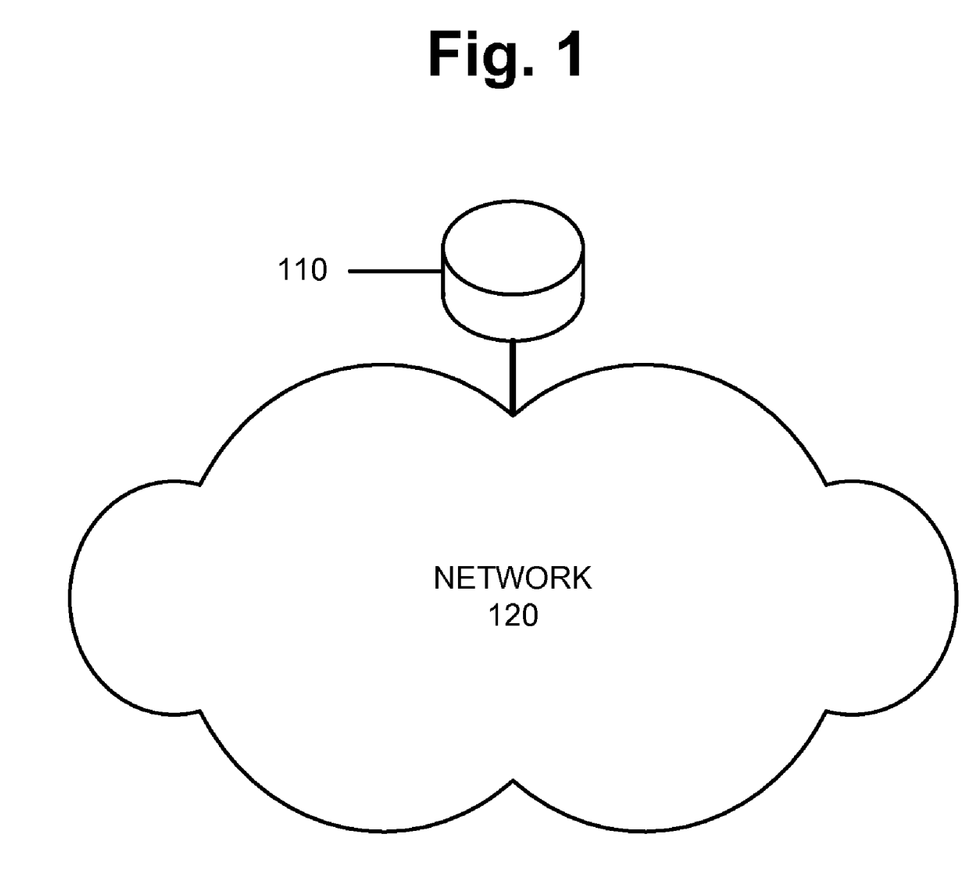
FIG. 1 is a diagram of an exemplary device.

FIG. 1 shows an exemplary device 110 in which concepts described herein may be implemented. As shown, device 110 may connect to network 120. Device 110 may include a device for performing network-related functions, such as a router, a server or a switch. Alternatively, device 110 may include a computer, communication device, etc., that communicates via network 120. Network 120 may include the Internet, an ad hoc network, a local area network (LAN), a wide area network (WAN), a metropolitan area network (MAN), a cellular network, a public switched telephone network (PSTN), any other network, or a combination of networks. Device 110 may communicate with other devices (not shown) and may communicate through a wired, wireless, or optical communication links via network 120.

Figure 2:
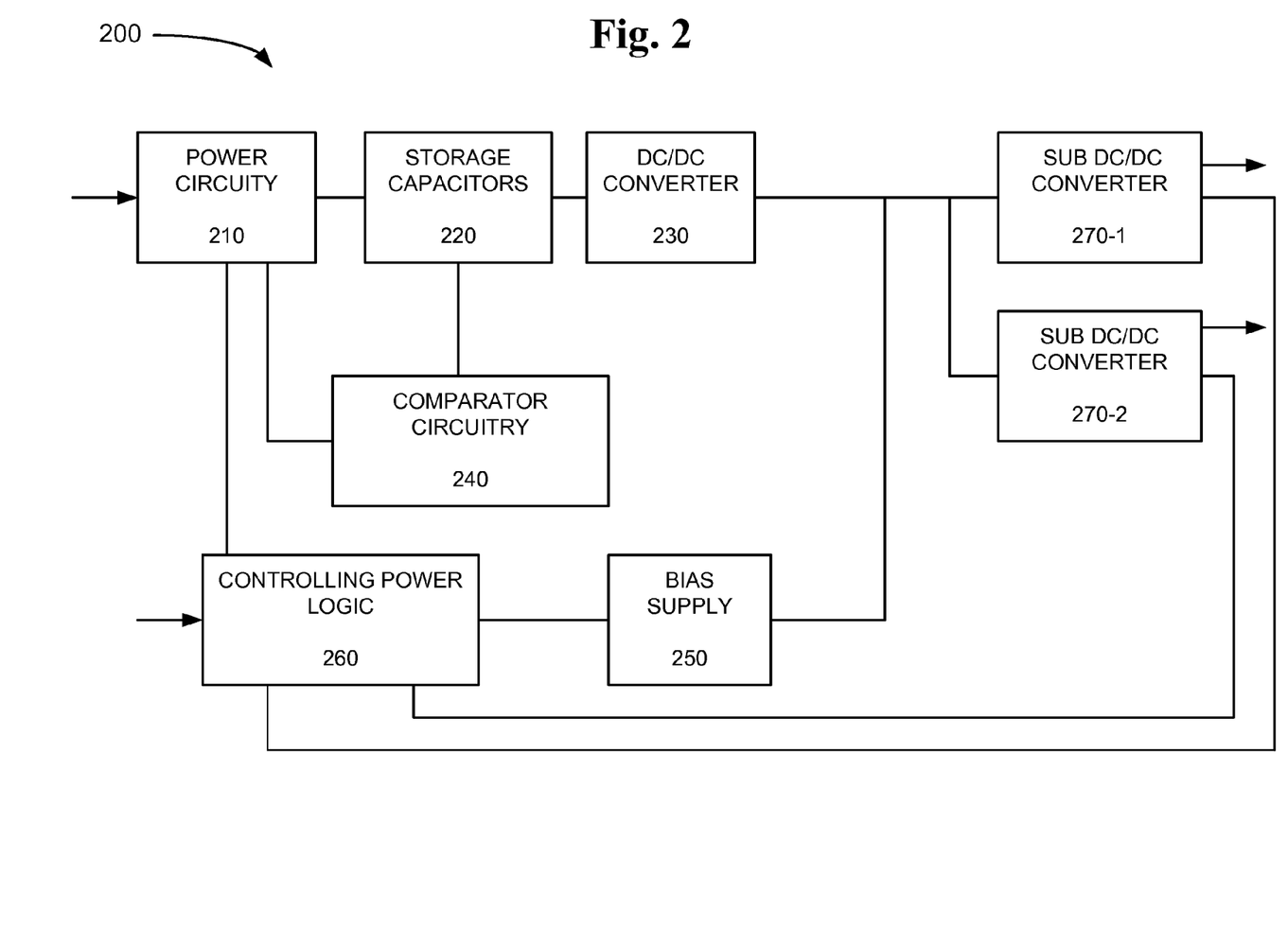
FIG. 2 is a block diagram of exemplary components of a power system included in the device as shown in FIG. 1.

FIG. 2 shows a block diagram of components within an exemplary power system 200 included in device 110. If device 110 is configured as a network device that controls forwarding of data, for example, there may be any number of exemplary power systems 200 included in device 110. For example, if device 110 is configured as a router, device 110 may include a number of line cards (e.g., 14 line cards), where each line card contains an exemplary power system 200. Power system 200 may include power circuitry 210, storage capacitors 220, DC/DC converter 230, comparator circuitry 240, bias supply 250, controlling power logic 260 and a number of sub assembly DC/DC converters 270-1 and 270-2 (referred to collectively as sub assembly DC/DC converters 270).

Power circuitry 210 may include switches and other circuitry used to receive direct current (DC) power from a source within device 110 and deliver power to storage capacitors 220. Input voltage into power circuitry 210 may be 48 volts DC, for example. When a main switch included within power circuitry 210 is in an off state, no component within power system 200 receives or consumes power.

Storage capacitors 220 may include capacitors used to store energy received from power circuitry 210. In an exemplary implementation, storage capacitors 220 may be large electrolytic capacitors. Storage capacitors 220 may also be connected to DC/DC converter 230 in order to stabilize the input voltage to DC/DC converter 230.

DC/DC converter 230 may include circuitry to convert a received DC voltage into another DC voltage. For example, the input voltage to DC/DC converter 230 may be 48 volts and the output voltage may be 12 volts. The output voltage of 12 volts may be applied to other DC/DC converters used in sub assemblies within power system 200 of device 110.

Comparator circuitry 240 may include circuitry that compares voltages and may activate a switch or send a switching signal in response to the comparison. For example, comparator circuitry 240 may receive or sense a voltage across storage capacitors 220 and may activate a switch and/or send a switching signal to power circuitry 210 in response to the sensed voltage.

Bias supply 250 may include circuitry to convert a received DC voltage and output a lower DC voltage. For example, bias supply 250 may receive 12 volts from DC/DC converter 230 and may output 5 volts to provide power to controlling power logic 260.

Controlling power logic (CPL) 260 may include circuitry that may receive signals from other components within device 110 and may send a signal to power circuitry 210 in response to the received signals. For example, CPL 260 may receive a power cycle signal and in response to this received signal, send a signal to set a switch in power circuitry 210 to an off state. CPL 260 may also send control signals to enable or disable individual sub assembly DC/DC converters 270 when power is turned on to device 110.

Sub assembly DC/DC converters 270 may include circuitry that receives an input voltage and outputs a lower voltage. For example, sub assembly DC/DC converter 270-1 may receive 12 volts from DC/DC converter 230 and output 3.3 volts to an Application Specific Integrated Circuit (ASIC) sub assembly within device 110. Sub assembly DC/DC converter 270-2 may receive 12 volts from DC/DC converter 230 and output 2.5 volts to a memory chip sub assembly within device 110. Sub assembly DC/DC converters 270 may also receive control signals from CPL 260. Although only two sub assembly DC/DC converters 270 are shown, it should be understood that any number of sub assembly DC/DC converters may be included within power system 200 depending on the voltage needs of various sub assemblies within device 110.

Figure 3:
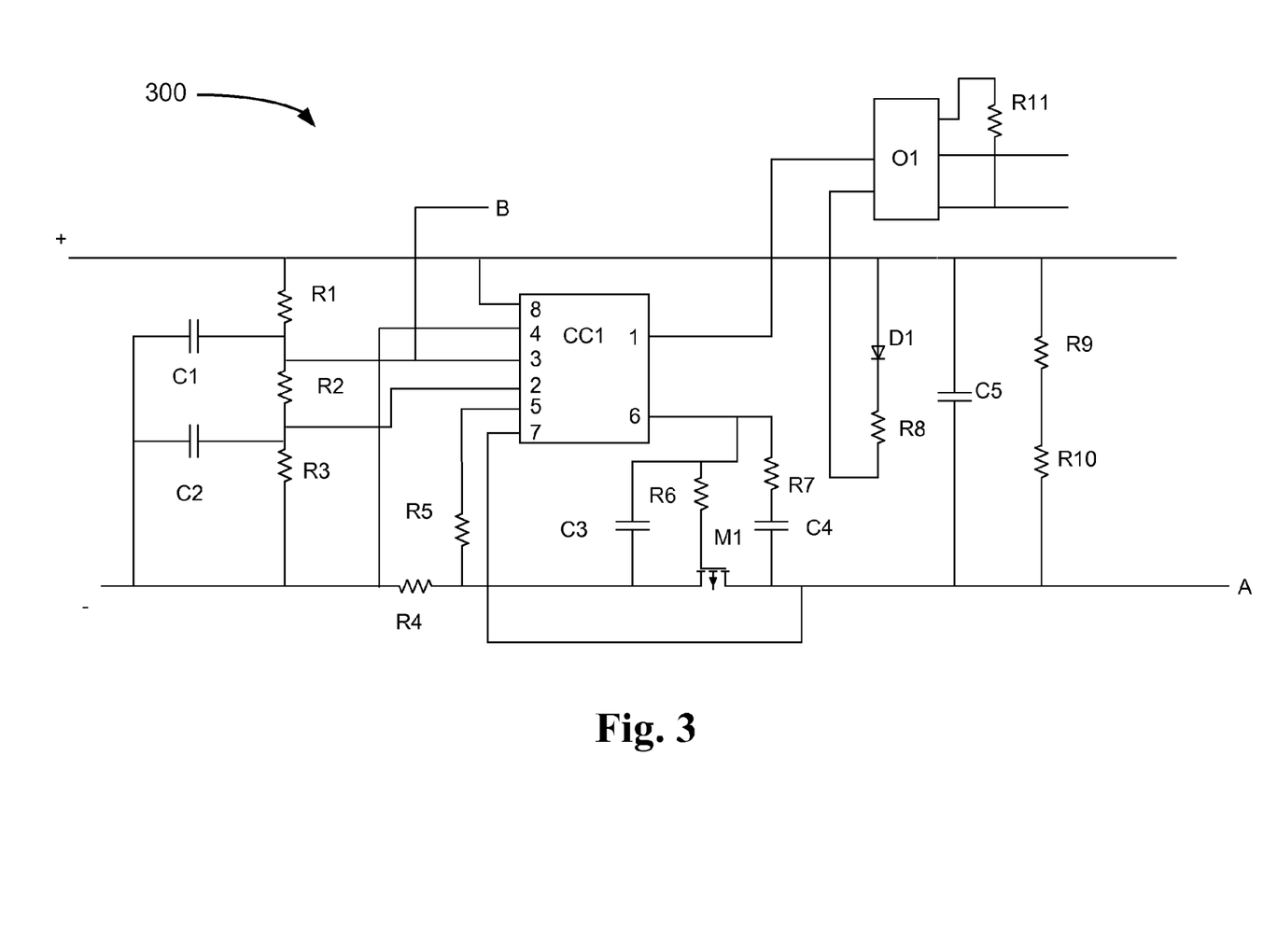
FIG. 3 is a schematic diagram of circuitry included in an exemplary power system.

FIG. 3 is a schematic diagram of circuit 300 that includes components included in the block diagram as shown in FIG. 2. Circuit 300 includes resistors R1-R11, capacitors C1-5, diode D1, metal oxide semiconductor field effect transistor (MOSFET) M1, optical coupling device O1 and control chip CC1. In an exemplary implementation, circuit 300 includes circuitry included in power circuitry 210 and storage capacitors 220.

As shown, circuit 300 may be used as a "hot swap" circuit that may be used to turn power on and off when an electronic assembly such as a line card is replaced in device 110. In this exemplary circuit, control chip CC1 may be used to control power applied to power system 200 by controlling an on/off state of MOSFET M1. In this example, control chip CC1 may include eight ports, labeled as 1-8. In this example, port 1 provides a power operational signal to optical coupling device O1, port 2 senses/receives an over-voltage protection signal, port 3 senses/receives an under-voltage protection signal, ports 4 and 8 receive power (to power control chip CC1), port 5 receives a signal via resistor R5 indicating voltage at the source of MOSFET M1, port 6 provides a voltage signal to control the gate of MOSFET M1 and port 7 receives a signal indicating voltage at the drain of MOSFET M1. Resistors R6 and R7 and capacitor C3 and C4 may be used to establish bias voltages required for MOSFET M1. In response to monitoring and/or detecting an over voltage or under voltage condition, control chip CC1 may turn off/on MOSFET M1 based on the detected voltage conditions within circuit 300. When voltages in circuit 300 are within appropriate ranges, control chip CC1 may leave MOSFET M1 in an "on" state, for example.

When power is applied to circuit 300 and voltages are within appropriate ranges (as determined by CC1), current through diode D1 and resistor R8 is received at optical coupling device O1. Additionally, port 1 of CC1 is connected to optical coupling device O1 and a signal indicating the circuit 300 is operational may be transmitted (through resistor R11) from the output terminals of optical coupling device O1 to a system controller (not shown) within device 110.

Resistors R1-R3 and capacitors C1-C2 form a buffer circuit that ensures when voltage is applied (to the positive terminal) or connected to circuit 300, the applied voltage may gradually rise to the applied value. As described above for example, a voltage of 48 DC volts may be input to the positive terminal of circuit 300. Resistors R1-R3 and capacitors C1-C2 allow applied voltage and current to slowly rise and to begin charging capacitor C5 through resistor R4 and MOSFET M1. Capacitor C5 may store energy received from the positive terminal of circuit 300, and may be included in storage capacitors 220 as described above in FIG. 2. Resistors R9 and R10 allow for capacitor C5 to discharge energy.

As shown, both FIG. 3 and FIG. 4 (described in detail below) include a positive (+) and negative (−) terminals. It should be understood that these similarly labeled terminals are electrically connected together, for example, the positive (+) terminal in FIG. 3 is connected to the positive (+) terminal in FIG. 4, and the negative (−) terminal in FIG. 3 is connected to the negative (−) terminal in FIG. 4. Further, terminal A in circuit 300 may be connected to terminal A in circuit 400, and similarly, terminal B in circuit 300 may be connected to terminal B in circuit 400. In this manner, components and signals included in circuits 300 and 400 may interact with one another to perform the desired functions. As described below for example, components and signals within circuit 400 may be used compare a voltage across capacitor C5 as shown in FIG. 3.

Figure 4:
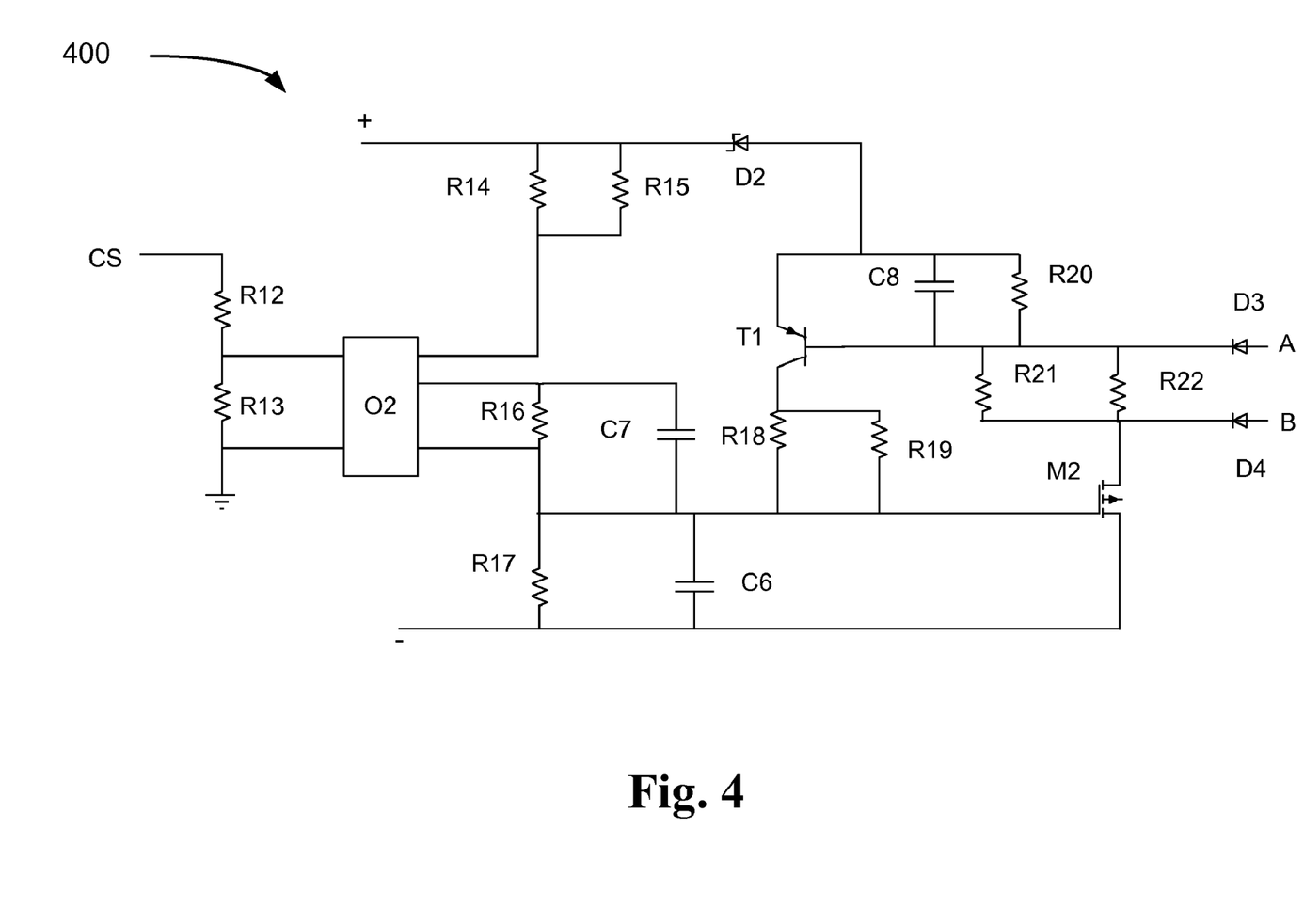
FIG. 4 is a schematic diagram of circuitry included in an exemplary power system.

FIG. 4 is a schematic diagram of circuit 400 that includes components shown in FIG. 2. Circuit 400 includes resistors R12-R22, capacitors C6-C8, diodes D2-D4, MOSFET M2, transistor T1 and optical coupling device O2. In an exemplary implementation, circuit 400 includes circuitry included in power circuitry 210 and comparator circuitry 240, as described above in FIG. 2.

As shown, circuit 400 may receive a control signal at terminal CS. For example, CPL 260 may send a power recycle signal that turns off the power (48 volts DC applied to the positive terminals in circuits 300 and 400), which may be received at the CS terminal. This received signal may be routed through resistors R12 and R13 to optical coupling device O2. Optical coupling device O2 receives power from the positive terminal of circuit 400 through resistors R14 and R15. Optical coupling device O2 couples the received power recycle signal command to the gate of MOSFET M2 through resistor R16. In other embodiments, optical coupling device O2, capacitor C7 and resistors R12-R16 may not be included in circuit 400. In this case, a received power recycle command signal may be connected directly to the gate of MOSFET M2.

A received power recycle signal drives the gate of MOSFET M2 to a high voltage and turns MOSFET M2 to a conducting or "on" state. Once MOSFET M2 is turned on, the drain of MOSFET M2 may be connected to port 3 of CC1 (via terminal B as shown in FIGS. 3 and 4) via diode D4. As described above, the signal on port 3 of CC1 is an under-voltage protection signal, where CC1 may shut down power to circuits 300 and 400 by turning off MOSFET M1 (via port 6 as shown in FIG. 3) when MOSFET M2 turns on. It should be understood that circuit 400 may be in an off state until a power recycle command is received. In addition, the received power recycle signal may be a temporary signal that does not remain in an "on" or high state, for example.

When MOSFET M2 turns on, the drain is connected to the base of transistor T1 through resistors R21 and R22. MOSFET M2 may then draw current from the base of transistor T1 and cause transistor T1 to turn on. Once transistor T1 turns on, it begins to supply power to the gate of MOSFET M2 through resistors R18 and R19. In this example, MOSFET M2 and transistor T1 form a latched circuit.

With the power to circuits 300 and 400 turned off, capacitor C5 may begin to discharge its stored energy through resistors R9 and R10. The positive terminal of C5 is also connected through diode D2 to the emitter of transistor T1. Diode D2 may be a Zener type of diode and may have a voltage drop of 11 volts, for example. The voltage drop across the emitter to the base of transistor T1 may be an additional 0.7 volts. In this example, the voltage difference between the positive terminal of capacitor C5 and the base of transistor T1 is approximately 12 volts. The base of transistor T1 connects to the negative terminal of capacitor C5 through diode D3 via terminal A. In this manner, diode D2, transistor T1 and diode D3 form a voltage comparator type of circuit where a voltage threshold may be approximately 12 volts. For example, if capacitor C5 is charged up to 48 volts, it may begin to discharge until it reaches 12 volts. When the voltage across capacitor C5 decreases to a value of 12 volts, diode D3 gets forward biased and starts conducting and the voltage at the base of transistor T1 increases until it is equal to the voltage at the emitter of transistor T1. This results in an inadequate biasing voltage, that produces a non-conducting off state for transistor T1. Once transistor T1 is turned off, it can not provide power to the gate of MOSFET M2, which results in MOSFET M2 being turned off. With the latched transistor T1 and MOSFET M2 being in an off state, the under voltage shutdown port (3) of CC1 is no longer pulled to a low voltage by MOSFET M2 via diode D4. Therefore, as CC1 no longer detects an under voltage condition, CC1 turns MOSFET M1 back on, which turns power back on to converter 230.

In this example, as capacitor C5 discharges its stored energy through resistors R9 and R10, the voltage across capacitor C5 may begin to decrease while the voltage across the source to the drain of MOSFET M1 may begin to increase. Assume the voltage at the positive terminal is 48 volts. When the voltage across capacitor C5 reaches 12 volts, the voltage across M1 may equal 36 volts. A signal applied at the gate of MOSFET M1 may then turn MOSFET M1 on, which turns power back on to circuits 300 and 400. In this manner, a received power recycle command turns on circuit 400 until capacitor C5 has discharged to the threshold voltage value. Then circuit 400 turns back off and turns MOSFET M1 (in circuit 300) back on.

Figure 5:
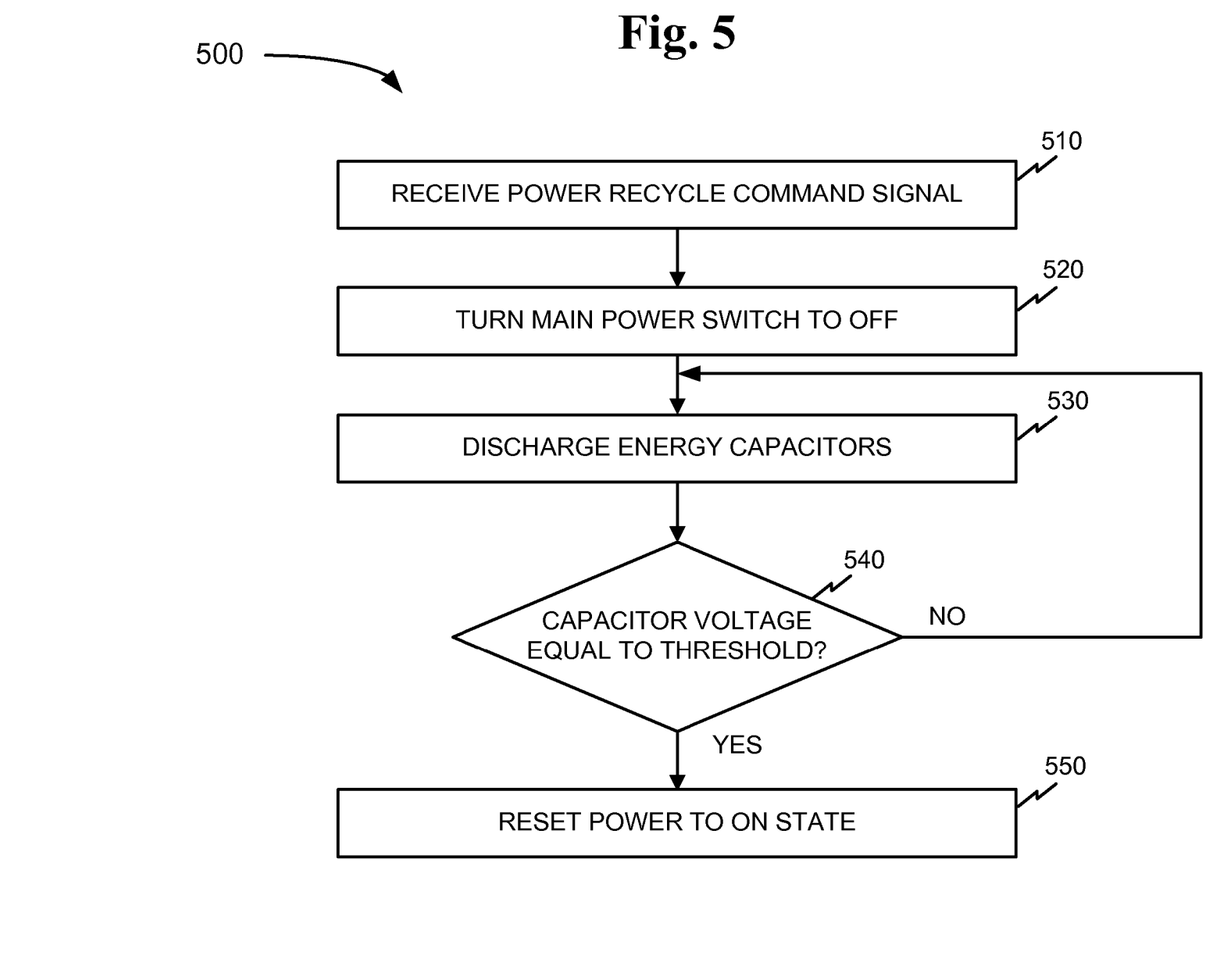
FIG. 5 is an exemplary flow diagram of a process that recycles power in the exemplary power system as shown in FIGS. 3-4.

FIG. 5 illustrates an exemplary process 500 of recycling power within a power system. Process 500 may be enacted for example, when a control assembly within device 110 instigates a power recycle command for any number of reasons. Process 500 may begin when a power recycle command signal is received (block 510). As described above for example, CPL 260 may receive a command from a control system within device 110 to recycle or reset the power applied to power system 200. In response to this received signal, CPL 260 may send a signal to power circuitry 210 to turn off a main power switch (block 520). As described above with reference to FIGS. 3-4 for example, the signal transmitted from CPL 260 may be received at terminal CS that results in turning off MOSFET M1. Once MOSFET M1 is turned off, there is no power applied to any component included in power system 200.

After MOSFET M1 is turned off, energy storage capacitors may begin to discharge (block 530). For example, capacitor C5 may discharge energy through resistors R9 and R10. As C5 discharges, its voltage is compared to a threshold value (block 540). As described above, diode D2, transistor T1 and diode D3 form a voltage comparator type of circuit where a voltage threshold may be approximately 12 volts. As capacitor C5 discharges, it's voltage is (compared) applied across diode D2 to the base of transistor T1, which forms a comparator circuit with a threshold of 12 volts, for example. If the voltage of capacitor C5 is greater than the threshold (No in block 540) process 500 may return to block 530 as the capacitor C5 may continue to discharge.

When the voltage of capacitor C5 has decreased to be equal to the threshold value (Yes in block 540), the power may be turned back to an on state (block 550). For example, if the voltage across capacitor C5 is 12 volts, there is not enough voltage to turn transistor T1 on, so the latch circuit formed by T1 and MOSFET M2 is turned off and MOSFET M1 may be turned back on via diode D4 and CC1. In this manner, the main power switch (MOSFET M1) may be controlled without power being applied to power system 200. Additionally, the rate at which capacitor C5 discharges may be changed by changing the values of resistors R9 and R10. For example, a time constant of discharging capacitor C5 is determined by the values of resistors R9 and R10. The values of resistors R9 and R10 may be set to form a time constant on the order of fractions of a second, a number of seconds, or minutes, for example. In this manner, the time it takes capacitor C5 to discharge to the threshold voltage (time period in which power system 200 resets) may be adjusted for any reason related to power system requirements. Further, the threshold voltage value (determined by the voltage drop from diode D2 to the base of transistor T1) may also be changed by changing the components and/or voltage requirements of these components.

CONCLUSION

Consistent with the principles described herein, the exemplary power system may use stored energy to control a main power switch during periods when the main power switch is turned off and no power is applied to the system.

The foregoing description of preferred embodiments provides illustration and description, but is not intended to be exhaustive or to limit the embodiments to the precise form disclosed. Modifications and variations are possible in light of the above teachings or may be acquired from practice of the embodiments. For example, while series of acts have been described with regard to FIG. 5, the order of the acts may differ or be performed in parallel in other implementations consistent with the present embodiments. No element, act, or instruction used in the description of the principles of the embodiments should be construed as critical unless explicitly described as such. Also as used herein, the article "a" is intended to include one or more items. Where only one item is intended, the term "one" or similar language is used.

The scope of the embodiments is defined by the claims and their equivalents.

Even though particular combinations of features are recited in the claims and/or disclosed in the specification, these combinations are not intended to limit the invention. In fact, many of these features may be combined in ways not specifically recited in the claims and/or disclosed in the specification.

What is claimed is:

1. A method comprising:
receiving a first signal to recycle power to a power system;
providing the first signal to a gate of a first metal oxide semiconductor field effect transistor (MOSFET) to cause a latch circuit to enter a conducting state;
transmitting a second signal to a port of a controller based on the latch circuit entering the conducting state;
receiving, based on transmitting the second signal, a third signal indicating an existence of a voltage condition associated with the power system;
preventing power from being supplied to the power system based on receiving the third signal;
determining that the third signal is no longer being received; and
allowing power to be supplied to the power system based on the determining.

2. The method of claim 1, where the latch circuit comprises a second MOSFET coupled to the port of the controller.

3. The method of claim 1, where preventing power from being supplied to the power system includes:
opening, based on the latch circuit entering the conducting state, a second MOSFET to cause an energy storage capacitor to discharge; and
where allowing power to be supplied to the power system includes:
causing the first MOSFET to enter a non-conducting state based on discharging the energy storage capacitor, and
opening the second MOSFET to cause power to be supplied to the power system based on the first MOSFET entering the non-conducting state.

4. The method of claim 1, where preventing power from being supplied to the power system includes:
opening, based on the latch circuit entering the conducting state, a second MOSFET to cause a capacitor to discharge; and
where allowing power to be supplied to the power system includes:
determining that a voltage across the capacitor corresponds to a threshold voltage, where the voltage across the capacitor corresponding to the threshold voltage causes the latch circuit to enter a non-conducting state, and
opening the second MOSFET to cause power to be supplied to the power system based on the latch circuit entering the non-conducting state.

5. The method of claim 1, where the first signal is received by a first switch, the method further comprising:
closing, based on receiving the first signal, the first switch to cause the second signal to be received at a port of a controller of the power system.

6. The method of claim 1,
where preventing the power from being supplied to the power system includes:
opening a second switch to prevent the power from being supplied to the power system further based on the latch circuit entering the conducting state, and
preventing the second switch from closing based on the latch circuit being in the conducting state.

7. The method of claim 1,
where the port of the controller is electrically coupled to a drain of the first MOSFET.

8. A device comprising:
a controller to:
detect an existence of a voltage condition associated with an electronic assembly of the device, the controller detecting the existence of the voltage condition when a latch circuit transitions from a first non-conducting state to a first conducting state,
control a first metal oxide semiconductor field effect transistor (MOSFET), based on detecting the existence of the voltage condition, the controller controlling the first MOSFET to enter:
a second conducting state that allows power to be supplied to the electronic assembly, when the controller does not detect the voltage condition, and
a second non-conducting state that prevents power from being supplied to the electronic assembly, when the controller detects the voltage condition,
a capacitor to:
store energy received via the first MOSFET, when the first MOSFET enters the second conducting state, and
discharge the stored energy when the first MOSFET enters the second non-conducting state;
a circuit to:
receive a signal to recycle the supply of power,
cause the latch circuit to enter the first conducting state based on receiving the signal to recycle the supply of power,
determine that a voltage across the capacitor corresponds to a threshold voltage based on the capacitor discharging the stored energy, and
cause the latch circuit to enter the first non-conducting state based on the voltage across the capacitor corresponding to the threshold voltage.

9. The device of claim 8, where the latch circuit includes a second MOSFET coupled to a port of the controller.

10. The device of claim 8, where the circuit includes:
a voltage comparator circuit to:
determine that the voltage across the capacitor corresponds to the threshold voltage, and
cause the latch circuit to enter the first non-conducting state when the voltage across the capacitor corresponds to the threshold voltage.

11. The device of claim 8, where the circuit includes:
a transistor, where a base of the transistor is electrically coupled to a negative terminal of the capacitor via a first diode, and an emitter of the transistor is electrically coupled to a positive terminal of the capacitor via a second diode,
where, when the capacitor corresponds the threshold voltage, the transistor causes the latch circuit to enter the first non-conducting state.

12. The device of claim 8, where the circuit includes:
a second MOSFET coupled to the controller and the latch circuit, the second MOSFET to:
receive the signal to recycle the supply of power, where the second MOSFET enters a third conducting state in response to receiving the signal to recycle the supply of power, and
cause the latch circuit to enter the first conducting state based on the second MOSFET entering the third conducting state.

13. The device of claim 12, where the second MOSFET is further to:
prevent the first MOSFET from entering the second conducting state while the second MOSFET is in the third conducting state.

14. The device of claim 12, where the second MOSFET is further to:
enter a third non-conducting state based on the voltage across the capacitor corresponding to the threshold voltage, and
cause the latch circuit to enter the first non-conducting state based on the second MOSFET entering the third non-conducting state.

15. A device comprising:
a circuit to:
receive a first signal to recycle power to the circuit,
cause a latch circuit to allow energy stored in a capacitor to be conducted to a first switching device,
transmit a signal to a port of a controller based on the latch circuit allowing the energy stored in the capacitor to be conducted to the first switching device,
determine, based on the controller receiving the signal at the port, an existence of a voltage condition within the circuit,
prevent power from being supplied to the circuit based on determining the existence of the voltage condition,
determine that the voltage condition no longer exists, and
allow power to be supplied to the power system based on the determining.

16. The device of claim 15, where, when preventing power from being supplied to the circuit, the circuit is to:
turn on, based on the latch circuit allowing the energy stored in the capacitor to be conducted to the first switching device, a second switching device to prevent the power from being supplied to the circuit, where turning on the second switching device causes the capacitor to discharge, and
where, when allowing power to be supplied to the circuit, the circuit is to:
turn off the first switching device based on discharging the energy storage capacitor, where, when turned off, the first switching device prevents power from being conducted through the first switching device, and
turn on the second switching device to cause power to be supplied to the circuit, where turning off the first switching device causes the second switching device to be turned on.

17. The device of claim 15, where, when preventing power from being supplied to the circuit, the circuit is to:
turn off, based on the latch circuit allowing the energy stored in the capacitor to be conducted to the first switching device, a second switching device to cause the capacitor to discharge, and
where, when allowing power to be supplied to the circuit, the circuit is to:
determine that a voltage across the capacitor corresponds to a threshold voltage, where the voltage across the capacitor corresponding to the threshold voltage causes the latch circuit to prevent the energy stored in the capacitor to be conducted to the first switching device, and
turn off the first switching device to cause power to be supplied to the circuit based on the latch circuit preventing the energy stored in the capacitor to be conducted to the first switching device.

18. The device of claim 17, where, when allowing power to be supplied to the circuit, the circuit is to:
turn on the second switching device, and
determine that the voltage condition no longer exists based on turning off the first switching device.

19. The device of claim 15, where the circuit includes a metal oxide semiconductor field effect transistor (MOSFET) that receives the first signal at a gate of the MOSFET to drive the gate to a high voltage state,
where a drain of the MOSFET is coupled to the port of the controller of the circuit,
where driving the gate to the high voltage state causes the port of the controller to be pulled to a low voltage state, and
where the existence of the voltage condition is determined based on the port of the controller being pulled to the low voltage state.

* * * * *